United States Patent [19]

Flowers et al.

[11] 3,862,092

[45] Jan. 21, 1975

[54] POLYAMIDE-IMIDE COMPOSITIONS

[75] Inventors: Ralph G. Flowers, Pittsfield;
Thomas L. Sherer, Richmond, both of Mass.

[73] Assignee: General Electric Company, New York, N.Y.

[22] Filed: July 5, 1973

[21] Appl. No.: 376,392

[52] U.S. Cl. ...... 260/78 TF, 117/128.4, 117/132 B, 117/232, 260/47 CP, 260/47 UA, 260/78 UA
[51] Int. Cl. ............................................. C08g 20/32
[58] Field of Search ....... 260/78 TF, 78 UA, 47 CP; 117/132 B, 47 UA

[56] References Cited
UNITED STATES PATENTS

| | | | |
|---|---|---|---|
| 3,576,691 | 4/1971 | Meyers | 156/309 |
| 3,661,852 | 5/1972 | Flowers et al. | 260/65 |
| 3,671,490 | 6/1972 | Bargain | 260/47 CP |
| 3,689,464 | 9/1972 | Holub et al. | 260/78 UA |
| 3,714,131 | 1/1973 | Hoback et al. | 260/78 TF |
| 3,732,189 | 5/1973 | Crivello et al. | 260/78 UA |

*Primary Examiner*—Lester L. Lee
*Attorney, Agent, or Firm*—Sidney Greenberg

[57] ABSTRACT

This invention relates to new polyamide-imide compositions having good hydrolytic stability and formed by reacting maleic anhydride with an intermediate diamine formed by reaction of trimellitic anhydride, hexamethylene diamine and an aromatic diamine. The resulting composition is useful for electrical insulating purposes in the form of films or coatings.

5 Claims, 1 Drawing Figure

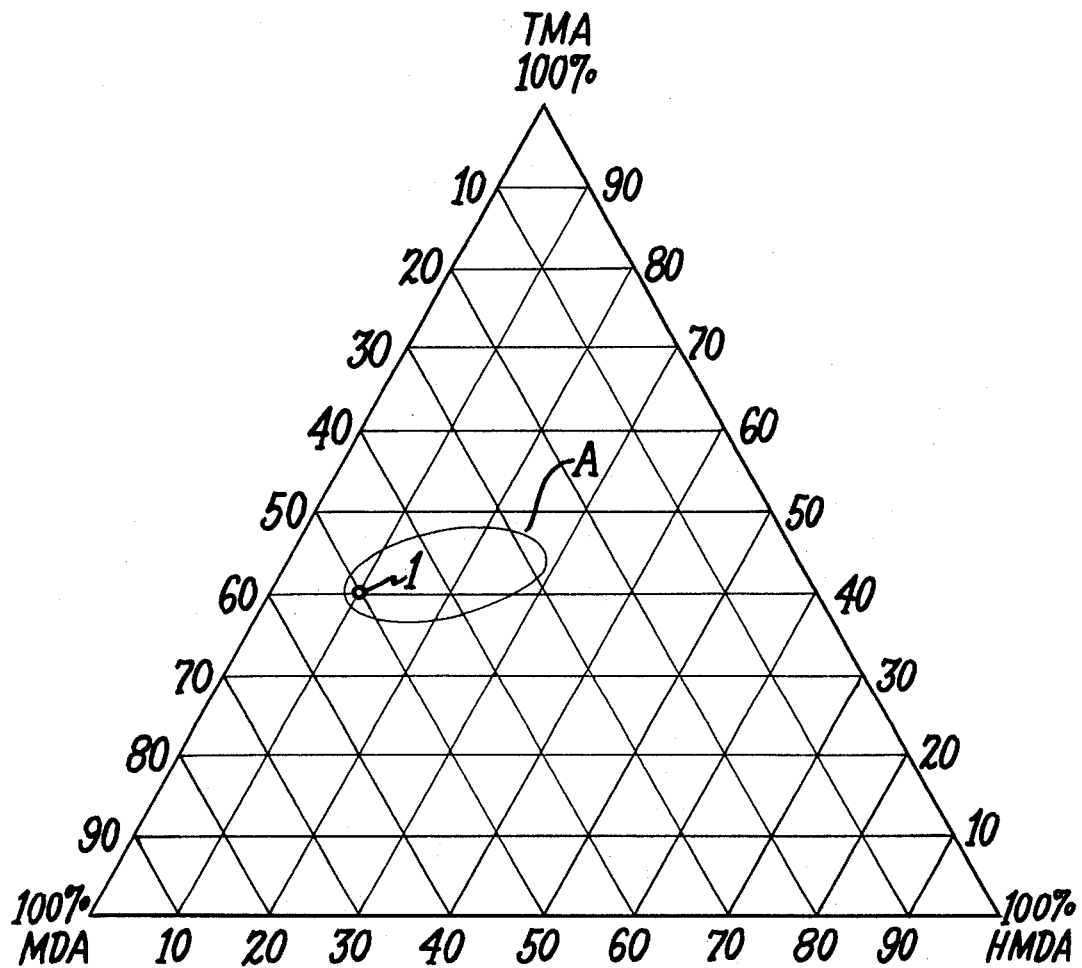

POLYAMIDE-IMIDE COMPOSITIONS

It is an object of the invention to provide novel polyamide-imide compositions useful for electrical insulating purposes, especially in the form of films or coatings, as on electrical conductors.

It is a particular object of the invention to provide novel polyamide-imide compositions of the above type which have excellent hydrolytic stability and are especially suited for use as wire coating materials in dielectric liquid-filled electrical apparatus such as power and distribution transformers.

It is still another object of the invention to provide polyamide-imide compositions of the above type having good flexibility, toughness and good electrical insulating and other properties.

Another object of the invention is to provide polyamide-imide compositions of the above type formed of relatively low cost materials which are readily soluble in inexpensive solvents such as cresol.

Other objects and advantages will become apparent from the following description and the appended claims.

With the above objects in view, the present invention in one of its aspects relates to a polyamide-imide composition comprising the product obtained by reacting (1) the reaction product of an aromatic diamine, trimellitic anhydride and hexamethylene diamine with (2) maleic anhydride.

This invention is an improvement on the polyamide-imide compositions disclosed in the patent to Flowers et al. U.S. Pat. No. 3,661,852.

The invention will be better understood from the following description taken in conjunction with the accompanying drawing, in which:

The single FIGURE is a triaxial diagram showing the relative molar proportions of the components forming an amide-imide diamine intermediate composition in accordance with the invention.

Trimellitic anhydride, employed as one of the components for forming the amide-imide diamine, has the following formula:

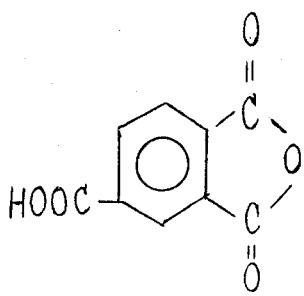

Hexamethylene diamine, used as a second component for forming the amide-imide diamine, has the following formula:

The aromatic diamine employed as the third component in forming the amide-imide diamine has the formula

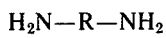

where R is a divalent aromatic group, the two amino radicals being attached to separate carbon atoms of the divalent group. While p,p' methylene dianiline has been satisfactorily employed for this component, other aromatic diamines may be used, such as those listed in U.S. Pat. No. 3,179,614 — Edwards and elsewhere, including benzidine, 4,4'-diamino diphenyl ether, 3,3'-dimethoxy-4,4'-diamino diphenyl methane, meta-phenylene diamine, para-phenylene diamine, 4,4' diamino diphenyl methane, and others.

In accordance with the present invention, the amide-imide diamine intermediate composition obtained as described above is reacted with maleic anhydride. The final product obtained by this reaction, referred to herein as a polyamide-imide composition, has been found to have exceptionally good hydrolytic stability while retaining excellent electrical properties, and coatings and films composed thereof are accordingly particularly satisfactory for use in electrical apparatus where exposure to moisture, evolved, for example, from cellulosic insulation therein, is likely. The amount of maleic anhydride used for the foregoing reaction is preferably in the range of about 1 to about 20 percent based on the weight of the diamine intermediate composition with which it is reacted, and a range of about 7 to about 15 percent by weight of maleic anhydride is particularly preferred.

The following is a typical procedure which may be used for preparing the amide-imide diamine intermediate and reacting it with maleic anhydride to form the polyamide-imide composition. The three ingredients trimellitic anhydride, hexamethylene diamine and the aromatic diamine, such as methylene dianiline, in suitable proportions are mixed together with a sufficient amount of a mixture of diisopropylbenzene and diphenyl ether to act as a heat transfer agent and facilitate the reaction. This mixture is then heated at elevated temperature, e.g., about 250°C, until the reaction is essentially complete as indicated by removal of the water of condensation. The diisopropylbenzene and diphenyl ether are removed during this reaction as the temperature increases. While hot, the reaction product is relatively viscous, and it is dissolved while in this condition in a suitable solvent such as cresol. The cresol solution is reacted with a suitable amount of maleic anhydride by stirring the mixture at about room temperature for about one-half to 1 hour to provide the final reaction product.

To provide an amide-imide diamine intermediate which on reaction with maleic anhydride produces a polyamide-imide composition with the desired properties in accordance with this invention, it is necessary to employ the three components of the intermediate diamine composition in a particular range of proportions. The relative amounts of trimellitic anhydride, hexamethylene diamine, and methylene dianiline in a preferred embodiment are depicted in the triaxial diagram of the drawing, in which the proportions of the ingredients are plotted interms of mole percentages. The proportions of the ingredients which provide improved results in accordance with the invention lie within the area designated A. As is well understood, the variable percentages of the three components represented by any point on the diagram are determined by projections to the relevant mole percentage scales along the sides of the triangle. Thus, for example, point 1 represents a preferred embodiment, corresponding to Example I described below, in which the components are present in the following approximate mole percents: trimetallitic anhydride — 40 percent, hexamethylene diamine 10 percent and methylene dianiline — 50 percent, which are obtained by the use of 4, 1 and 5 moles respectively of these components. As can be readily calculated, these amounts respectively correspond to the following approximate percentages by weight: trimetallic anhydride — 41 percent, hexamethylene diamine — 6 percent, and methylene dianiline — 53 percent.

The approximate ranges of proportions in terms of percent by weight which may be used in accordance with the invention, where mathylene dianiline is used as the aromatic diamine, are as follows, it being understood that the particular proportions used must still conform in terms of molar percents lying within area A of the accompanying triaxial diagram:

| trimellitic anhydride (TMA) | 38 – 52% |
| hexamethylene diamine (HMDA) | 5 – 20% |
| methylene dianiline (MDA) | 30 – 55% |

The examples below will illustrate the practice of the invention, it being understood that they are to be taken as exemplary only:

EXAMPLE I

In this Example, 345 parts by weight of trimellitic anhydride were mixed with 169 parts of diisopropylbenzene and 106 parts of diphenyl ether while heating to about 140°C. At this time a mixture of 52 parts by weight of hexamethylene diamine, 62 parts methylene dianiline and 35 parts of diphenyl ether were slowly added. The exothermic reaction taking place during this addition was sufficient to maintain the desired temperature. When all of this diamine mixture had been added, 383 parts by weight of methylene dianiline were introduced into the reaction kettle and heat was once more applied. Stirring was continued throughout the process. Water was collected in a Dean-Stark trap as the mixture was gradually heated to about 230°C at which time it was held between 230°C and 240°C for about an hour. The hot intermediate was dissolved by adding 1,290 parts by weight of a creosol-phenol solvent to give a 29.9 percent solution. The weights of the ingredients in this intermediate correspond to a mole ratio of 4, 1 and 5 for the trimellitic anhydride, hexamethylene diamine and methylene diamine, respectively. The 115 parts of this solution was diluted with 31 parts of cresol and reacted wtih 3.5 parts of maleic anhydride, amounting to about 10 percent by weight of the intermediate, by mixing at room temperature for about 1 hour. A very flexible film was obtained from a sample of this polymer which had been applied to the surface of an aluminum disk and cured at 200°C for 30 minutes and then 300°C for 4 minutes. This film was also characterized by good hydrolytic stability and good electrical properties.

EXAMPLE II

In this Example, the intermediate of Example I was reacted with maleic anhydride amounting to about 7 percent by weight of the intermediate. A film with good flexibility was obtained.

EXAMPLE III

In this Example, the intermediate of Example I was reacted with maleic anhydride amounting to about 18.6 percent by weight of the intermediate. Good flexibility was obtained with this film.

EXAMPLE IV

In this experiment, 288 parts by weight of trimellitic anhydride, 317 parts of methylene dianiline and 81 parts hexamethylene diamine, corresponding to 39.5, 42.1 and 18.4 mole percentages of the respective ingredients, were stirred vigorously while heating with 172 parts by weight of xylene. This mixture was heated to about 240°C for 1 hour during which time the xylene and water of condensation were removed with a Dean-Stark trap. The viscous red product was dissolved in 200 parts of cresol to give a 24 percent solution. Ten parts of this solution were reacted at room temperature with 0.28 parts maleic anhydride (11.6 percent of the intermediate). A film prepared by coating an aluminum disk with this solution and curing at 200°C for 20 minutes followed by 5 minutes at 300°C was flexible.

EXAMPLE V

In this Example, an intermediate diamine was prepared using the procedure of Example IV in which 448 parts by weight of trimellitic anhydride, 462 parts of methylene dianiline and 90 parts of hexamethylene diamine, corresponding to a 3, 3 and 1 mole ratio, were reacted. Then 11.5 parts of a 24 percent solution of this intermediate was reacted with 0.35 parts of maleic anhydride (11.2 percent of the intermediate), and this product gave a very flexible coating when cured on an aluminum disk.

EXAMPLE VI

Using the procedure of Example IV an intermediate was prepared from 484 parts by weight of trimellitic anhydride, 399 parts methylene dianiline and 117 parts of hexamethylene diamine, corresponding to 5, 4 and 2 moles of the respective ingredients. A flexible coating was obtained from a solution of this intermediate with 11 percent maleic anhydride.

EXAMPLE VII

Using the procedure of Example IV an intermediate was prepared from 261 parts trimellitic anhydride, 240 parts methylene dianiline and 87.6 parts of hexamethylene diamine, corresponding to 9, 8 and 5 moles of the respective ingredients, Maleic anhydride, 19 parts (7.3 percent), was mixed with 1,080 parts by weight of this 24 percent solution and applied to size 18 copper wire to give a coating which had excellent flexibility, hydrolytic stability and electrical properties.

EXAMPLE VIII

Using the procedure of Example IV an intermediate was prepared from 505 parts by weight of trimellitic anhydride, 183 parts of hexamethylene diamine and 312 parts of methylene dianiline, corresponding to 5, 3 and 3 moles of the respective ingredients. A film of excellent flexibility was formed from a mixture of 11.5 parts by weight of a 24 percent solution of this intermediate, 2 parts cresol and 0.4 parts maleic anhydride (12.7 percent) which had been cured at 200°C for 20 minutes followed by 300°C for 4 minutes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A polyamide-imide composition consisting essentially of the product obtained by reacting (1) the reaction product of trimellitic anhydride, hexamethylene diamine and an aromatic diamine with (2) maleic anhydride, wherein said trimellitic anhydride, hexamethylene diamine and aromatic diamine have molar porportions lying within the area defined approximately by Area A in the accompanying triaxial diagram.

2. A composition as defined in claim 1, wherein said aromatic diamine is methylene dianiline.

3. A metal having a coating thereon of a polyamide-imide composition as defined in claim 1.

4. A composition as defined in claim 1, wherein about 1 to about 20 percent of maleic anhydride by weight of said reaction product is employed.

5. A composition as defined in claim 4, wherein about 7 to about 15 percent of maleic anhydride by weight of said reaction product is employed.

* * * * *